United States Patent [19]

Pezat et al.

[11] 4,259,110

[45] Mar. 31, 1981

[54] PROCESS FOR STORING OF HYDROGEN AND THE USE THEREOF, PARTICULARLY IN ENGINES

[75] Inventors: Michel Pezat, Martillac, France; Abdelmalek Hbika, Meknes, Morocco; Bernard Darriet, Saucats; Paul Hagenmuller, Taleuce, both of France

[73] Assignee: Agence Nationale de Valorisation de la Recherche (ANVAR), Neuilly sur Seine, France

[21] Appl. No.: 55,725

[22] Filed: Jul. 9, 1979

[30] Foreign Application Priority Data

Jul. 7, 1978 [FR] France ................................ 78 20382

[51] Int. Cl.³ .......................... C01B 1/32; C01B 1/35
[52] U.S. Cl. ................................ 75/168 J; 75/168 H; 75/168 K; 75/168 B; 423/647
[58] Field of Search ............. 75/168 J, 168 R, 168 H, 75/168 K, 168 B; 423/644, 647

[56] References Cited

U.S. PATENT DOCUMENTS

| 2,642,358 | 6/1953 | Kent et al. ............................ 75/152 |
| 2,882,145 | 4/1959 | Lucien et al. ......................... 75/168 |
| 4,110,425 | 8/1978 | Bühl et al. ....................... 423/648 R |

FOREIGN PATENT DOCUMENTS 2324980  4/1977  France ................................... 423/644

OTHER PUBLICATIONS

Shinar et al., "Hydrogen Sorption . . . " Jour. Less-Common Metals, 60, (1978), 209.
Busch et al., "Hydrides . . . of Intermetallic Compounds," Jour. Less Common Metals, 60, (1978), 83.
Achard et al., "Ternary Hydrides . . . ," Second Intn. Congress on $H_2$ in Metals, Paris, Jun. 1977, pp. 1-6-/IE-12.
Reilly et al., "The Reaction of H1 . . . Mg . . . ," Inorganic Chemistry, 7, (1968), 2254.
Douglass, ". . . Mg-Alloy-Hydrides . . . ," Met. Trans., AIME, 6A, (1975), 2179.

*Primary Examiner*—L. Dewayne Rutledge
*Assistant Examiner*—Upendra Roy
*Attorney, Agent, or Firm*—Omri M. Behr

[57] ABSTRACT

The invention relates to the storing of hydrogen in hydrides of metallic alloys.

Figure 1:
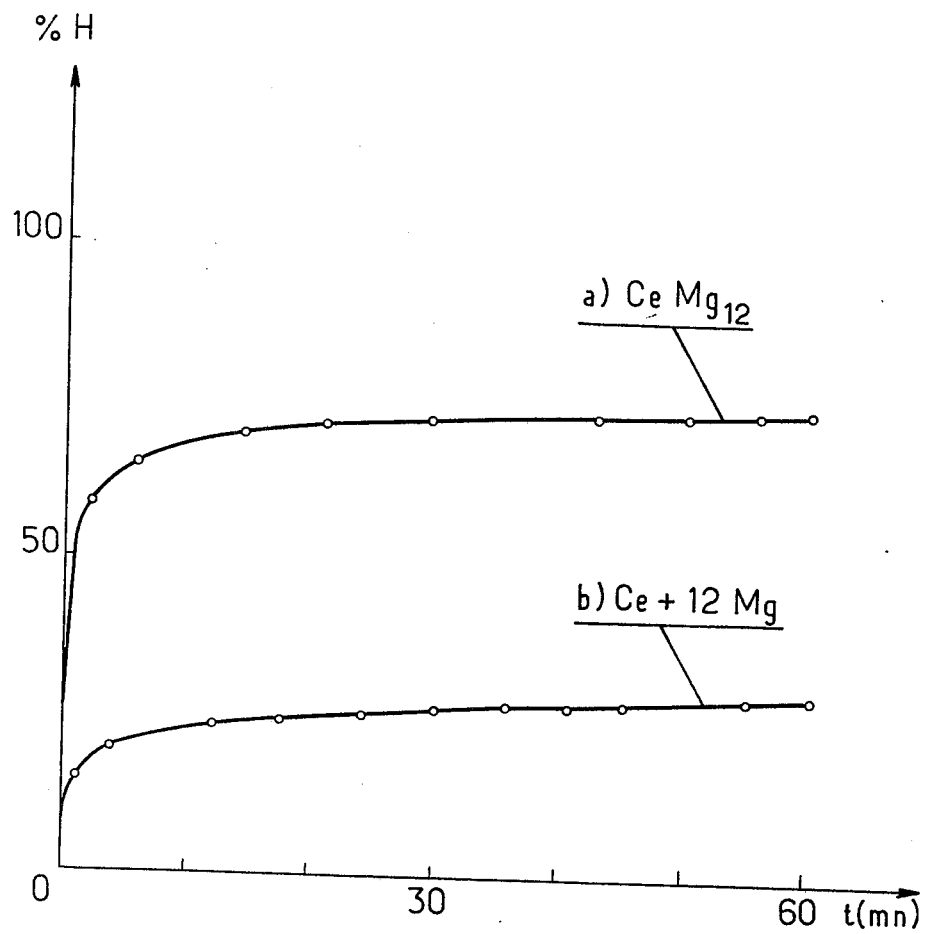

These alloys include besides magnesium an element chosen from the lanthanides and/or element of group IIa of the periodic classification of elements. The magnesium may be, furthermore, possibly substituted among others by a transition metal. These alloys allow the reactivity of the magnesium to be increased in relation to the hydrogen during the hydrogen absorption process as shown by the curves of FIG. 1.

Application: supplying hydrogen engines or other hydrogen energy receiving or transforming means with hydrogen.

19 Claims, 6 Drawing Figures

PROCESS FOR STORING OF HYDROGEN AND THE USE THEREOF, PARTICULARLY IN ENGINES

The invention relates to processes for storing hydrogen in the form of metal hydrides and for the use thereof, particularly in engines or other energy receiving or transforming menas (e.g. fuel cells), and it also concerns the devices for putting these processes into effect.

It relates more particularly to a process of hydrogen storing using magnesium metal alloys capable of reacting with hydrogen while leading to dissociable hydrides. It also relates to the manufacture of these alloys.

Different metal-metal hydride systems have been studied in view of the possibilities of application thereof as means for storing hydrogen.

The titanium (Ti) and iron (Fe) TiFe-TiFeH based system has more particularly received attention and forms the object of industrial applications. But it presents the disadvantage of being heavy and fairly expensive.

The research for lighter systems has led to studying magnesium Mg and its hydride $MgH_2$. Magnesium presents, besides the advantage of being light, that of being abundant, of a low cost price and of leading to an hydride possessing a high hydrogen capacity per unit of mass. But, along with these qualities of great interest, it has the disadvantage of reacting with hydrogen, to form the hydride $MgH_2$, at relatively high temperatures and pressures.

Previous work of certain of the co-inventors of the present invention has shown that the conditions for obtaining magnesium hydride may be considerably improved by mixing magnesium with other metals and/or alloys, more particularly metals and/or alloys leading to hydrides which are formed an decomposed at ordinary pressures and temperatures.

The prosecution of work in this field has led the present inventors to further improve the performances of systems containing magnesium by using this latter in the form of alloys formed by means of special metal elements.

The invention relates to a new process of hydrogen storing comprising contacting hydrogen, under temperature and pressure conditions enabling the formation of the desirable hydrides, with magnesium alloys of formula I $$L_{a-ax}T_{ax}Mg_{b-by}M_{by} \qquad (I)$$

in which:

L represents an element chosen from the lanthanides, more especially lanthanum (La), cerium (Ce), praseodymium (Pr) and neodymium (Nd), or else among the cerium based alloys, T represents an element chosen from the metals in group IIa, more particularly from calcium (Ca), strontium (Sr) and barium (Ba), M represents an element chosen from the transition metals, aluminium (Al), silicon (Si) and tin (Sn), x is a number from 0 to 1 inclusive, y is a number from 0 to 1 inclusive and a and b are indices corresponding to the stoichiometry of the elements in the alloy with the provisos that, when x and y are equal to 0 the indices a and b are respectively different from 1 and 1, 1 and 3, 2 and 17 and that when x is equal to 0 and that a and b are respectively equal to 1 and 2, or 1 and 3, or 2 and 17, M does not represent Ni.

The alloys of formula I used according to the invention contain advantageously a preponderant atomic proportion of magnesium and thus allow full advantage to be taken of the properties and qualities of the magnesium recalled above.

According to one interesting aspect, because of the metal elements entering, with magnesium, into their composition, they react easily and rapidly with hydrogen, generally already at the ambient temperature.

The hydrogen capacity per unit of mass of the hydrides formed is high and mostly of the order of 5%; it may reach with certain hydrides values of the order of 6% as is shown in the examples given further on in the description.

To these performances, there is added the advantage that these alloys lead to easily dissociable hydrides, in particular more easily dissociable than $MgH_2$ alone or mixed with metal and/or alloy hydrides.

According to one embodiment of the invention, the process of hydrogen storing is carried on with at least one binary magnesium alloy.

One of the preferred families of binary magnesium alloys comprises the alloys of formula I in which the indices x and y are zero and which are then formed as constituent elements by L and Mg.

Such binary alloys correspond to formula II:

$$L_a Mg_b \qquad (II)$$

in which L, a and b have the meanings mentioned above with the provisos already given.

Another family of binary alloys useful in the process of the invention comprises the alloys in which the constituent element accompanying Mg is the element T. In this case, the index x of formula I is equal to 1, whereas y is equal to zero.

These alloys, which present among other things the advantage of leading to low cost hydrides and having a high hydrogen capacity per unit of mass, are illustrated by formula III:

$$T_a Mg_b \qquad (III)$$

in which T, a and b have the above mentioned meanings. In another preferred embodiment the process of the invention is carried out with families of magnesium alloys comprising ternary of quarternary alloys. In these alloys, the partial replacement of element L and/or Mg by the substitution metals commented on above allows, particularly, by modifying the electropositivity of the cationic network the character of the metal-hydrogen bond in the corresponding hydrides to be changed and, consequently, the stability of these hydrides to be influenced so as to increase their decomposition speed.

In preferred ternary alloys used in the process of the invention, element L is partially substituted by T, which corresponds to alloys of formula IV:

$$L_{a-ax}T_{ax} Mg_b \qquad (IV)$$

in whch L, T, a and b have the above mentioned meanings and x is a number between 0 and 1.

The partial substitution by T leads to hydrides which, besides the advantage of a high capacity per unit of mass, are of a low cost price.

Other ternary alloy families correspond to the case where Mg is partially substituted by element M, which corresponds generally to alloys giving more easily dissociable hydrides.

In formula I, index x is then equal to 1 and index y represents a positive number, between 0 and 1.

These alloys correspond to formula V:

$$T_a Mg_{b-by} M_{by} \qquad (V)$$

In a variation, x in formula I is equal to 0, y representing a non-zero number, between 0 and 1. The corresponding ternary alloys have formula VI:

$$L_a Mg_{b-by} M_{by} \qquad (VI)$$

In these formulas V or VI, L, T, M, a and b are such as defined in relation with formula I and y is a non-zero number, less than 1 with the provisos already given.

In the quarternary alloys used in the invention, each of the constituent elements is partially substituted, which further optimizes the different advantages considered above. These quarternary alloys are illustrated by formula VII:

$$L_{a-ax} T_{ax} Mg_{b-by} M_{by} \qquad (VII)$$

in which the different elements and indices have the meanings indicated in formula I, x and y being positive numbers between 0 and 1.

In the above defined magnesium alloy families, it is advantageous to choose at least one of the symbols used in the formulas from the following groups. Thus, L will form part of the group formed by La, Ce and a ceric metal based alloy including a predominant amount of cerium, and more especially that commercialized under the mischmetal name, T from Ca, Sr and Ba, M from Al, Zn, Co, Fe, Ti, Cr, Mn and V, x in the range from 0 to 1 and y close to 0,1.

The alloys of formulae IV to VII are new and part of the invention. In view of their application for hydrogen storing, the alloys rich in magnesium are particularly preferred as they give hydrides having satisfactory desorption properties.

The process of the invention, in particular when carried out with alloys rich in magnesium leads to hydrides whose decomposition, in easy implementation conditions, allows the major part of the hydrogen absorbed to be recovered. Alloy groups more especially preferred in the above families for hydrogen storing have a structure offering a great capacity for receiving hydrogen.

In one of these groups, very particularly preferred, the indices defining the stoichiometry of L and/or T on the one hand with Mg or Mg and M on the other hand are numbers respectively from 1 to 5 and from 12 to 41.

The alloys of this group in which these stoichiometric proportions are respectively close to 1 and 12-13, prove particularly interesting because of their behavior during the hydridation process.

Alloys in which the stoichiometric proportions of the elements defined by said indices are respectively of the order of 5 and 41, are also satisfactory.

According to an additional arrangement, it is advantageous to carry out the process of the invention with magnesium alloy corresponding to the above structure, mixed with at least one other magnesium metal alloy. The presence of such an alloy, if need be formed in situ, i.e. during the co-fusion of the different metal elements and the magnesium exerts a favorable effect particularly on the desorption speed of the stored hydrogen.

The contacting of the alloys used with hydrogen is carried out at as low a temperature as possible, but allowing the corresponding hydrides to be obtained in an optimum time.

It is advantageous from this point of view to operate at temperatures varying from ambient temperature to about 450° C. and at a pressure of about 0 to 50 bars, the temperature and the pressure chosen being maintained preferably constant during the hydridation reaction.

A thorough study of the hydridation process of the alloys used which will be illustrated hereafter with examples, shows that in the range of temperature and pressure studied, the action of the hydrogen causes, during a first hydridation cycle, decomposition of the alloy and formation of the corresponding hydrides. This decomposition is effected in an irreversible reaction.

From the second hydridation cycle, a dissociation of the hydrides formed may be observed, in which $MgH_2$ releases substantially all the hydrogen absorbed, the other hydrides of the reaction mixture releasing a small part of the hydrogen which they contain.

The implementation of the process of the invention, in industry, or transport, presents a great interest in storing and using hydrogen.

The alloys preferably used in the invention enable to benefit from structures capable of retaining large amounts of hydrogen and thus forming hydrogen reserves.

In one advantageous aspect of the use of these alloys as hydrogen reserves, the reaction enclosure itself in which the hydrides have been formed, may serve as a hydrogen reservoir and be used directly for the recovery of hydrogen. Such reservoirs are useful in numerous applications. In particular, they may advantageously replace the heavy hydrogen cylinders used in industry and in laboratories. The magnesium present in the alloys allows, in addition to the storing of the hydrogen, the nitrogen and water vapor purification thereof.

It is also interesting to use such reservoirs for supplying motors or other energy receiving or transforming apparatus, the corresponding installations also coming within the scope of the invention.

Such an installation comprises, for example, a sealed hydride storing element from which the hydrides emerge into a reservoir supplying a motor. The cold-produced hydrogen allows the motor to be started up, the burnt gases from which may be used for raising the pressure and the temperature of the hydride reservoir which may then produce hydrogen at a high rate. On stopping the motor, the hydrogen which remains in the reservoir may be restored to the hydride mixture which can be used again for cold starting.

The alloys used in the invention may be prepared by any known technique. Advantageously, the components of the alloy are mixed in stoichiometric proportions in the melted condition, particularly at a temperature of the order of 1000° to 500° C., then the ingot thus obtained is subjected to annealing at a temperature advantageously of the order of 700° to 300° C.

The first melting and mixing step is carried out in a closed crucible in an inert gas atmosphere without using a flux, as for example of a metal halogenide.

The alloys obtained which are of a very high purity may be used directly in the form of metal blocks or crushed then reduced to fine possibly pelletized powder.

Other characteristics and advantages of the invention will appear in the following examples and from the figures to which reference is made.

EXAMPLE I

Preparation of the Ce $Mg_{12}$ alloy.

Into a molybdenum crucible are introduced the components Ce and Mg in proportions for obtaining the desired stoichiometry.

In a dry and de-oxygenated argon atmosphere, the crucible being sealed, a mixture is formed by co-fusion of Ce and Mg by bringing them for about 1 hour to a temperature of the order of 700° C.

The ingot is annealed, for homogenization, for about 15 hours at a temperature close to 500° C., still in a dry and de-oxygenated argon atmosphere.

A crystallographic examination of the alloy obtained shows that it has a structure of the $ThMn_{12}$ type which is derived from $CaCu_5$.

EXAMPLE II

Hydridation of the Ce $Mg_{12}$ alloy.

The alloy of example I, such as obtained in the form of a metal block, or reduced to powder, possibly pelletized, is contacted with a gaseous hydrogen flow at a temperature of 325° C. at a hydrogen pressure of 30 bars.

This first hydridation cycle, effected for about an hour, leads to the irreversible decomposition of the alloy and to the formation of the hydrides corresponding to each of the elements, according to the reaction diagram:

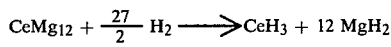

$$CeMg_{12} + \frac{27}{2} H_2 \longrightarrow CeH_3 + 12 MgH_2$$

From the 2nd hydridation cycle, achieved in the same conditions of temperature and pressure, the reaction is reversibly effected according to the reaction diagram below:

$$CeH_3 + 12 MgH_2 \underset{2}{\overset{1}{\rightleftharpoons}} CeH_z + 12 Mg + \frac{27-z}{2} H_2$$

where z is a number from 2.5 to 3.0.

In FIG. 1 there is shown the hydrogen absorption curve with respect to time, obtained in the second hydridation cycle with the alloy Ce $Mg_{12}$ (curve a).

By way of comparison, there is also shown the corresponding curve obtained with a mixture of Ce and Mg in atomic proportions of 1:12 (curve b).

It can be seen, by referring to this figure, that the use of the components Ce and Mg in the form of an alloy rather than in a mixture allows a higher hydridation speed to be obtained. This improvement in performance must come from the more homogeneous distribution of the components in the alloy, in comparison with the mixture, and from the much finer granulometry of the particles.

Figure 2:
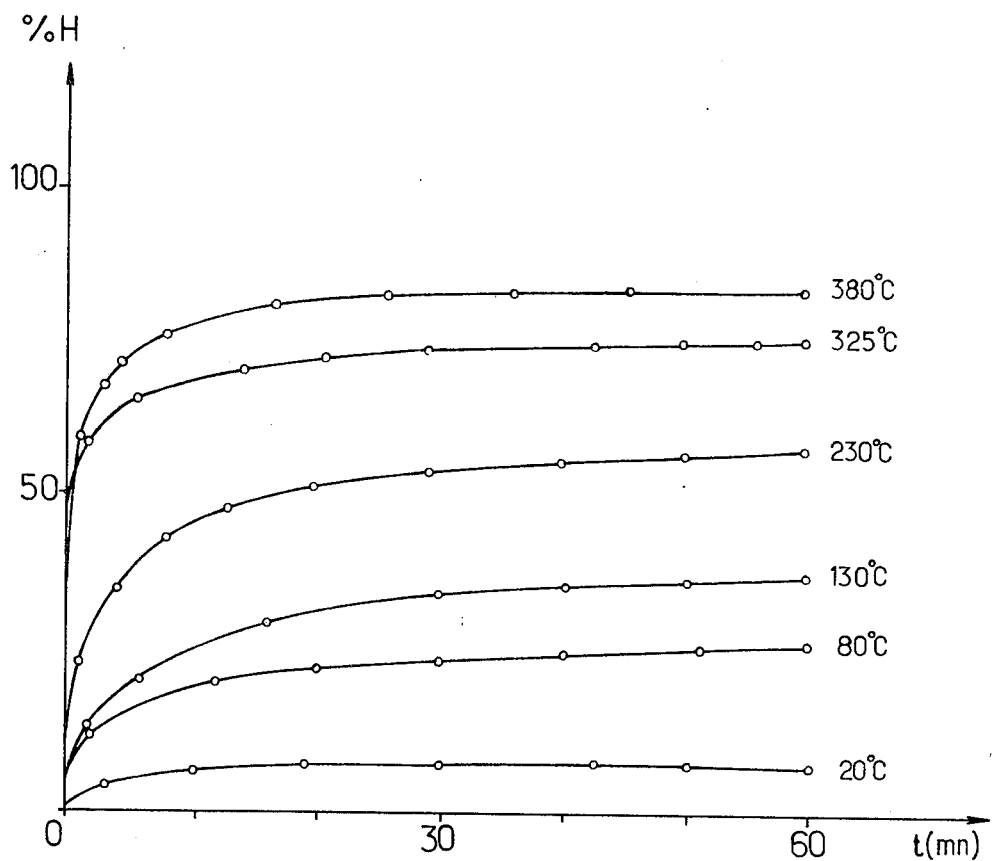

In FIG. 2, there are shown the hydrogen absorption curves of Ce $Mg_{12}$, with respect to time, obtained at a hydrogen pressure of 30 bars, in the second hydridation cycle, at different temperatures between 20° C. and 380° C. An examination of these curves shows that Ce $Mg_{12}$ has an appreciable hydridation speed from ambient temperature.

The thermal decomposition of the hydrides formed allows about 90% of the hydrogen fixed by $CeMg_{12}$ to be recovered, which comes essentially from the thermal dissociation of $MgH_2$ formed during the hydridation.

The hydrogen capacity per unit of mass of the hydride is 4.7% after an hour.

Proceeding as for example I, alloys of $LaMg_{12}$ and mischmetal $Mg_{12}$ are prepared. The hydridation of these alloys under the conditions described in example II leads to results which are comparable to those mentioned above.

EXAMPLE III

Preparation and hydridation of the alloy

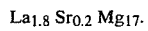

$La_{1.8} Sr_{0.2} Mg_{17}$.

This compound is prepared according to the method of example I, then it is subjected to a first hydridation cycle at 325° C. at a hydrogen pressure of 30 bars, which leads to the irreversible decomposition of the alloy and to the formation of the hydrides corresponding to each of the elements in accordance with the reaction diagram below:

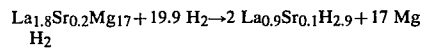

$$La_{1.8}Sr_{0.2}Mg_{17} + 19.9\ H_2 \rightarrow 2\ La_{0.9}Sr_{0.1}H_{2.9} + 17\ MgH_2$$

From the second hydridation cycle carried out as previously, the following reversible reaction is achieved:

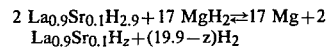

$$2\ La_{0.9}Sr_{0.1}H_{2.9} + 17\ MgH_2 \rightleftharpoons 17\ Mg + 2\ La_{0.9}Sr_{0.1}H_z + (19.9-z)H_2$$

where z is a number from 2.5 to 2.9.

Figure 3:
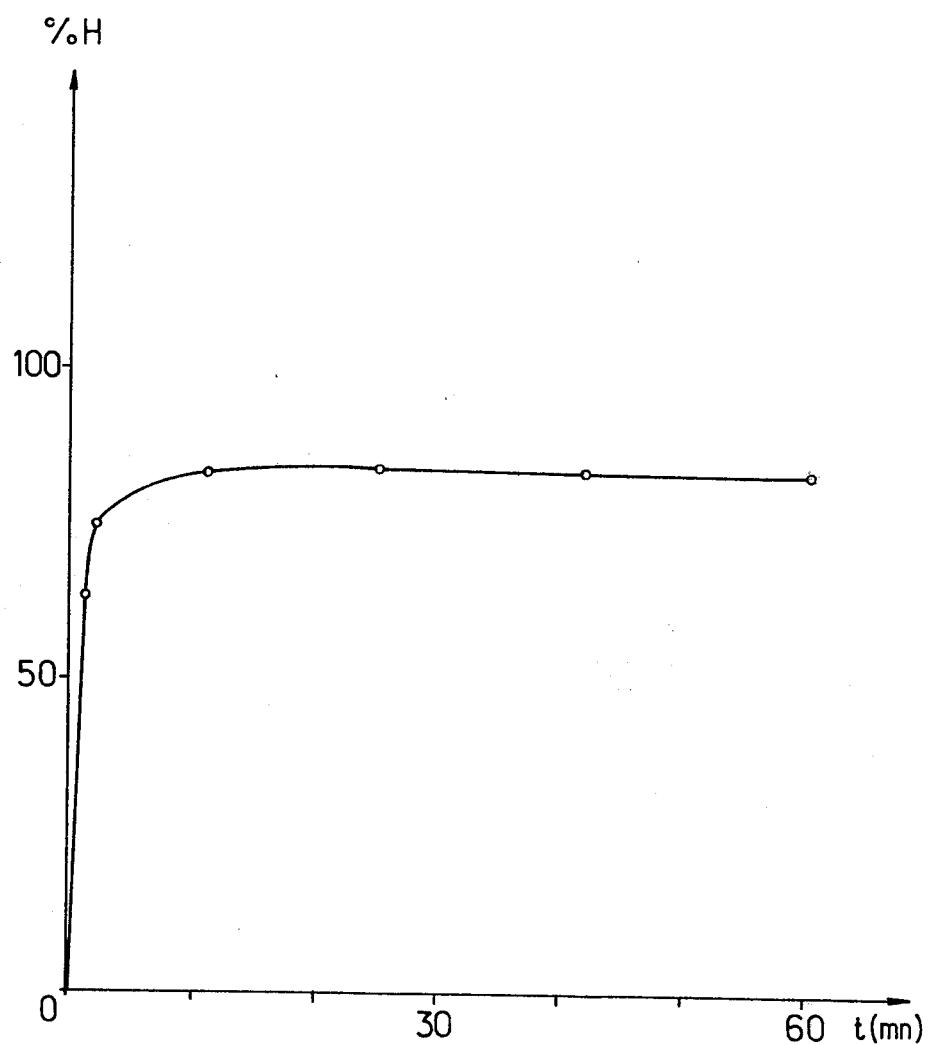

FIG. 3, in which is given the curve of hydrogen absorption by the alloy with respect to time in the second hydridation cycle, brings out the interesting performances of the alloy.

It will thus be noted that practically immediately 86% of $H_2$ are absorbed.

After an hour, the hydrogen capacity per unit of mass of the hydrides formed is 4.8%.

EXAMPLE IV

Preparation and hydridation of the alloy $Ce_5Mg_{41}$.

The preparation and the hydridation of $Ce_5Mg_{41}$ are carried out in accordance with the above described process for $CeMg_{12}$.

Figure 4:
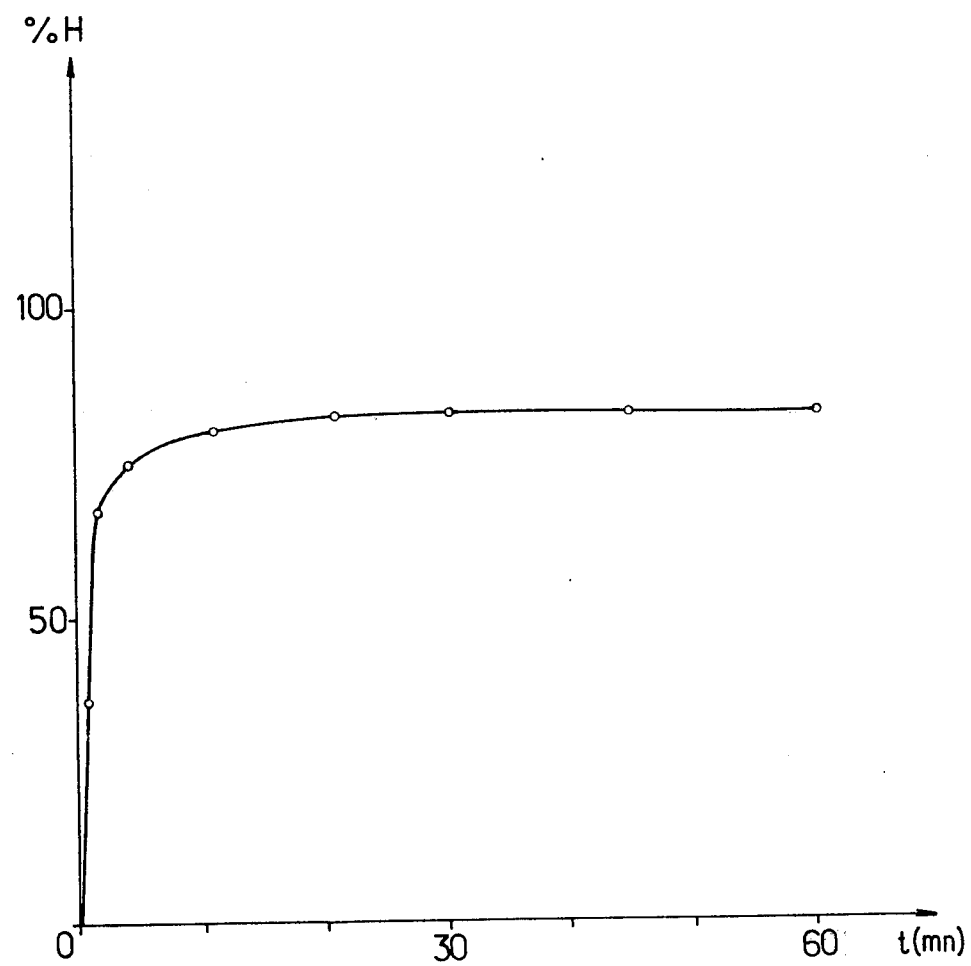

There can also be observed in the first hydridation cycle, the irreversible hydride decomposition of the component elements. In FIG. 4, there is shown the hydridation curve of $Ce_5Mg_{41}$ with respect to time in the second hydridation cycle at 325° C. and at a hydrogen pressure of 30 bars. The results relative to the hydridation are comparable with those obtained with the preceding magnesium alloys.

Figure 5:
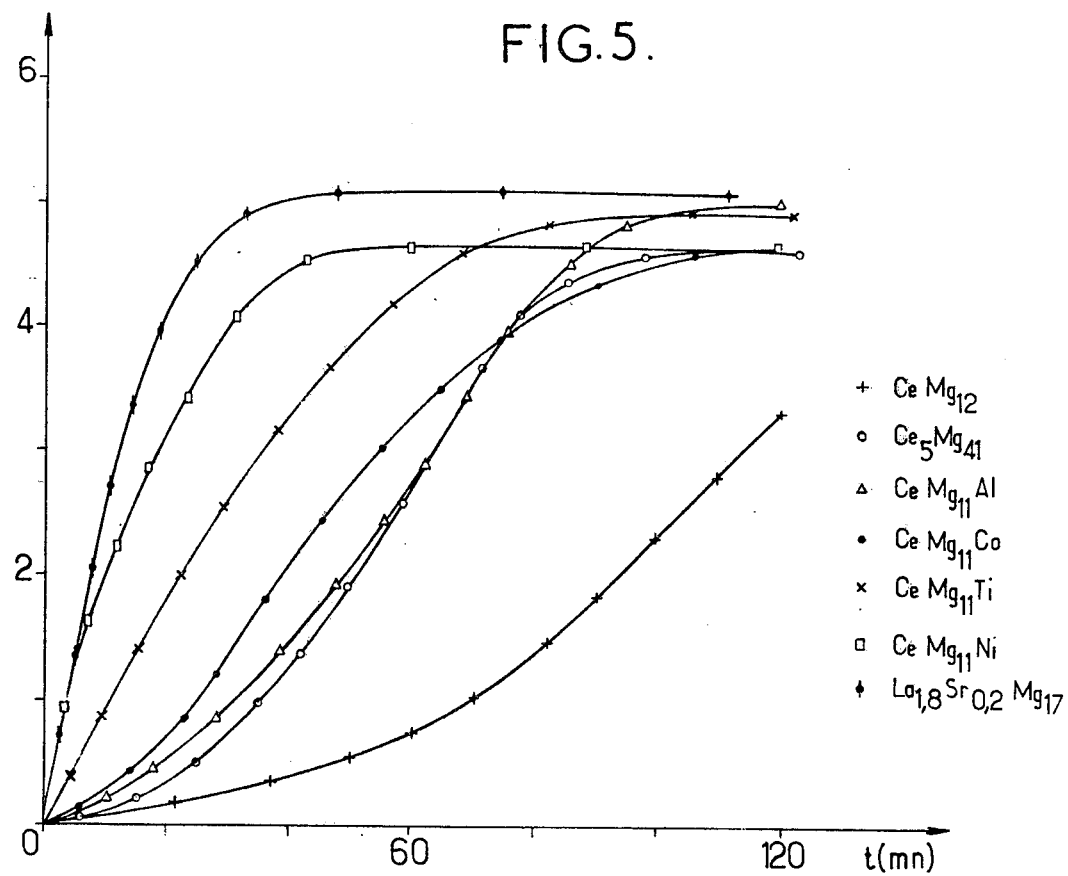

FIG. 5 shows the hydrogen desorption curve with respect to time, at 325° C. and at a hydrogen pressure of 2 bars, of the hydrides of the component elements of the alloy considered. An examination of this curve shows that the hydrides formed dissociate, advantageously, readily.

EXAMPLE V

Preparation of magnesium alloys from Ce, Mg and Ni.

The use, in the co-fusion reaction of example I, of elements Ce, Mg and Ni leads to the formation of phases $Ce_2Mg_{17}$ and $Mg_2Ni$ in accordance with the process below:

$$2\ Ce + 22\ Mg + 2\ Ni \rightarrow Ce_2Mg_{17} + 2\ Mg_2Ni + Mg.$$

The hydridation process more particularly of $Ce_2Mg_{17}$ is similar to that described in example I relative to $CeMg_{12}$.

The presence of $Mg_2Ni$ formed "in situ" causes a very substantial improvement in the desorption speed as shown by the curve corresponding to this mixture given in FIG. 5.

EXAMPLE VI

Preparation and hydridation of the alloy $CeMg_{11}Al$.

During hydridation, the behavior of this alloy is close to that of $CeMg_{12}$. The action of the hydrogen leads to the formation of cerium hydride and magnesium hydride in which the aluminium is substituted for a small quantity of magnesium. The presence of aluminium allows more particularly the decomposition speed of the magnesium hydride to be improved as shown by the corresponding curve in FIG. 5.

There is also shown in this FIG. 5, the hydrogen desorption curves of $CeMg_{11}Co$, $CeMg_{11}Zn$ and $CeMg_{11}Ti$.

An examination of the different curves of the figure brings out the favourable effect of the substitutions effected on the magnesium or lanthanide.

EXAMPLE VII

Application of the hydride mixture of example 2 for supplying motors.

Figure 6:
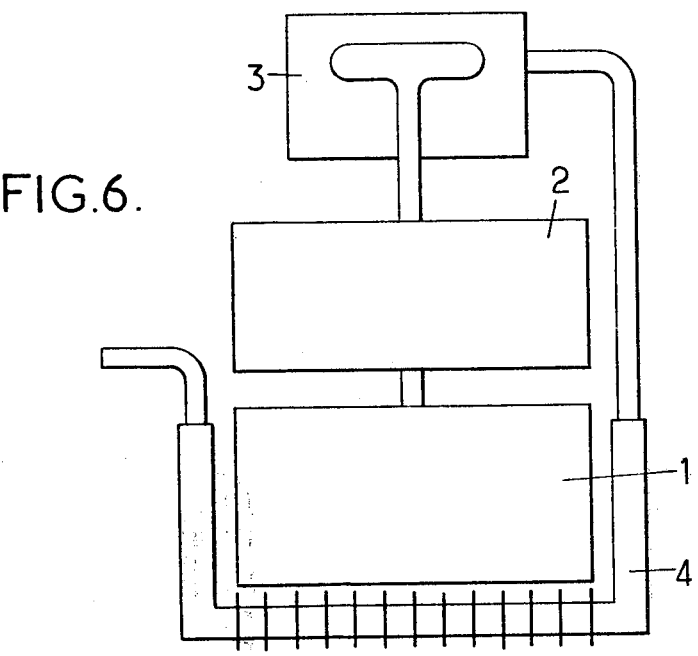

The hydride mixture $MgH_2$—$CeH_3$ is used for supplying a thermal motor, according to the diagram shown in FIG. 6.

The hydride mixture is contained in a first sealed reservoir 1, which communicates with an expansion reservoir 2, this latter supplying motor 3 with hydrogen.

The pressure in reservoir 2 is for example of the order of 2.5 bars, and the hydrogen flow sufficient for starting the motor.

Heating of the mass stored in reservoir 1 is then provided, for example, as shown in FIG. 6, by heat coming from the exhaust system 4 of the motor, to allow decomposition of $MgH_2$ which then ensures operation of the motor.

After the motor is stopped and, therefore, reservoir 1 cooled, the hydrogen pressure and volume available in reservoir 2 will be sufficient for reforming the hydrides for starting up again.

The hydride mixtures of the invention can also be used for supplying with hydrides electrochemical devices, particularly electrochemical cells or fuel cells.

The process described in the above application may be used again here. The heating of reservoir 1 will be effected by Joule effect by taking a part of the energy of the cell.

As is evident and as it follows furthermore already from what has gone before, the invention is in no way limited to those of its embodiments and modes of application which have been more especially considered; it embraces, on the contrary, all variations thereof.

What is claimed is:

1. A process for storing hydrogen in metal hydrides comprising contacting the hydrogen with at least one alloy having the structure of formula I $$L_{a-ax} T_{ax} Mg_{b-by} M_{by} \qquad (I)$$

wherein:
L is a member selected from the group consisting of a lanthanide element and an alloy of cerium with another lanthanide element, said alloy containing a major proportion of cerium,
T is an element selected from the group consisting of the metals of group IIa,
M is an element selected from the group consisting of the transition metals, aluminum, silicon or tin,
x is a number between 0 and 1,
y is a number between 0 and 1,
a and b are indices corresponding to the stoichiometry of the elements of the alloy, b being different from 0 and by,
With the provisos that when x and y are equal to 0, a and b are respectively different from 1 and 1, 1 and 3, 2 and 17 and that when x is equal to 0 and that a and b are respectively equal to 1 and 2, or 1 and 3, or 2 and 17, M does not represent Ni.

2. A process according to claim 1 comprising the use of at least one binary alloy of formula II:

$$L_a Mg_b \qquad (II)$$

in which L, a and b are as defined in claim 1.

3. A process according to claim 1 comprising utilizing at least one binary alloy of formula III:

$$T_a Mg_b \qquad (III)$$

wherein T, a and b are as defined in claim 1.

4. A process according to claim 1, comprising utilizing at least one ternary alloy of the formula IV:

$$L_{a-ax} T_{ax} Mg_b \qquad (IV)$$

wherein L, T, a, b and x are as defined in claim 1.

5. A process according to claim 1 comprising utilizing at least one ternary alloy of formula V:

$$T_a Mg_{b-by} M_{by} \qquad (V)$$

wherein T, M, a and b are as defined in claim 1, a is a non-zero number and y is a non-zero number less than 1.

6. A process according to claim 1 comprising utilizing at least on tertiary alloy of formula VI:

$$L_a Mg_{b-by} M_{by}$$
(VI)

wherein a and b are as defined in claim 1, a is a non-zero number and y is a non-zero number less than 1.

7. A process of claim 1 comprising utilizing at least one quarternary alloy of formula VII;

$$L_{a-ax} T_{ax} Mg_{b-by} M_{by} \qquad (VII)$$

wherein L, T, M, a, b, x and y are as defined in claim 1, and a is a non-zero number.

8. A process according to claim 1 wherein L is selected from the group consisting of lanthanum, cerium praseodymium, neodymium and an alloy of cerium with another lanthanide containing a major portion of cerium, T is selected from the group consisting of calcium, strontium and barium, and M is selected from the group consisting of aluminum, zinc, nickel, cobalt, manganese, chromium and vanadium.

9. A process according to claim 1 characterized by the fact that the indices defining the stoichiometry of L and/or T on the one hand and Mg or Mg and M on the other hand are numbers respectively from 1 to 5 and from 12 to 41.

10. A process of claim 1 comprising carrying out the reaction at a pressure of between 0 to 50 bars and a temperature of between ambient temperature to about 450° C., the temperature and pressure being preferably maintained constant during said reaction.

11. A process according to claim 1 characterized by the fact it comprises the use of at least one binary alloy of formula II $$La\ Mg_b \qquad (II)$$

wherein L is such as defined in claim 1, a is equal to 1 and b is a number from 10 to 13.

12. A process according to claim 1 wherein T is Ca or Sr.

13. A process according to claim 1 wherein M is chosen in the group consisting of V, Cr, Mn, Fe and Ni.

14. A process according to claim 8 wherein the cerium/lanthanide alloy is mischmetal and y is approximately 0.1.

15. A process according to claim 9 wherein said indices are respectively close to 1 for the stoichiometric proportion of L and/or T and close to 12 for that of Mg or Mg and M.

16. A process according to claim 9 wherein said indices are respectively close to 5 for the stoichiometric proportion of L and/or T and close to 41 for that of Mg or Mg and M.

17. A process for preparing an alloy having the structure $$L_{a-ax}T_{ax}Mg_{b-by}M_{by}$$

wherein:

L is a member selected from the group consisting of a lanthanide element and an alloy of cerium with another lanthanide element, said alloy containing a major proportion of cerium, T is an element selected from the group consisting of the metals of group IIa, M is an element selected from the group consisting of the transition metals, aluminum, silicon or tin, x is a number between 0 and 1, y is a number between 0 and 1, a and b are indices corresponding to the stoichemistry of the elements of the alloy, b being different from 0 and by, With the provisos that when x and y are equal to 0, a and b are respectively different from 1 and 1, 1 and 3, 2 and 17 and that when x is equal to 0 and that a and b are respectively equal to 1 and 2, or 1 and 3, or 2 and 17, M does not represent Ni comprising mixing the components of said alloy in stoichiometric proportion in the melted state at a temperature of between 500° and 1,000° C., and annealing the thus obtained product at a temperature of between 300° and 700° C.

18. A process of claim 17 wherein the alloy is a ternary alloy selected from the group of alloys of the formulae $$L_{a-ax}T_{ax}Mg_b$$

$$T_aMg_{b-by}M_{by}$$

$$L_aMg_{b-by}M_{by}$$

wherein L, T, M, a and by are as defined in claim 17, a is a non-zero number and y is a non-zero number less than 1.

19. A process according to claim 17, wherein the alloy is a quarternay alloy of the formula $L_{a-ax}T_{ax}Mg_{b-by}M_{by}$ wherein L, T, M, a, b, x and y are as defined in claim 17 and a is a non-zero number.

* * * * *